Feb. 13, 1945.   H. F. BAKEWELL   2,369,273
ROTARY CUTTING TOOL
Filed March 23, 1943   4 Sheets-Sheet 1
Fig. 1.
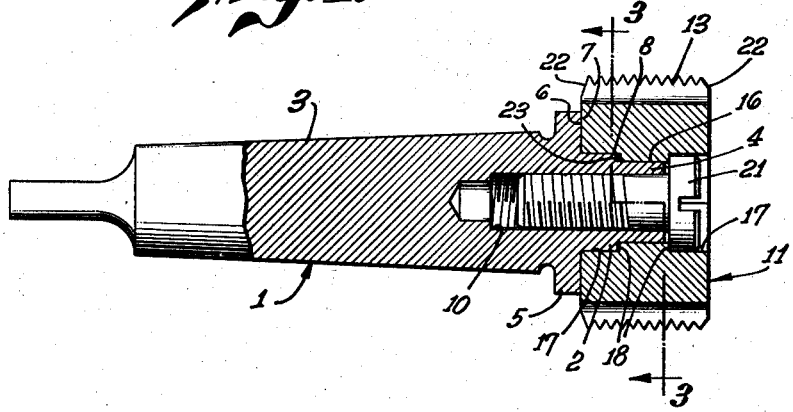
Fig. 3.
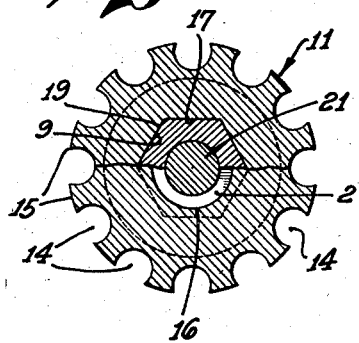
Fig. 2.
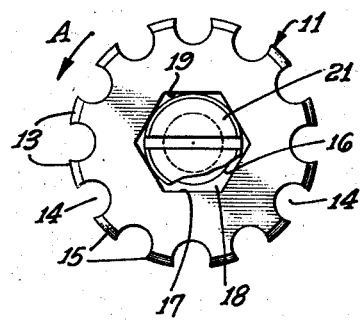
Fig. 4.
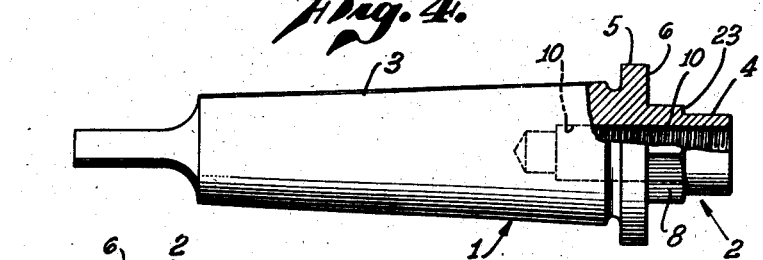
Fig. 5.
HARDING F. BAKEWELL,
INVENTOR.
BY
ATTORNEY.

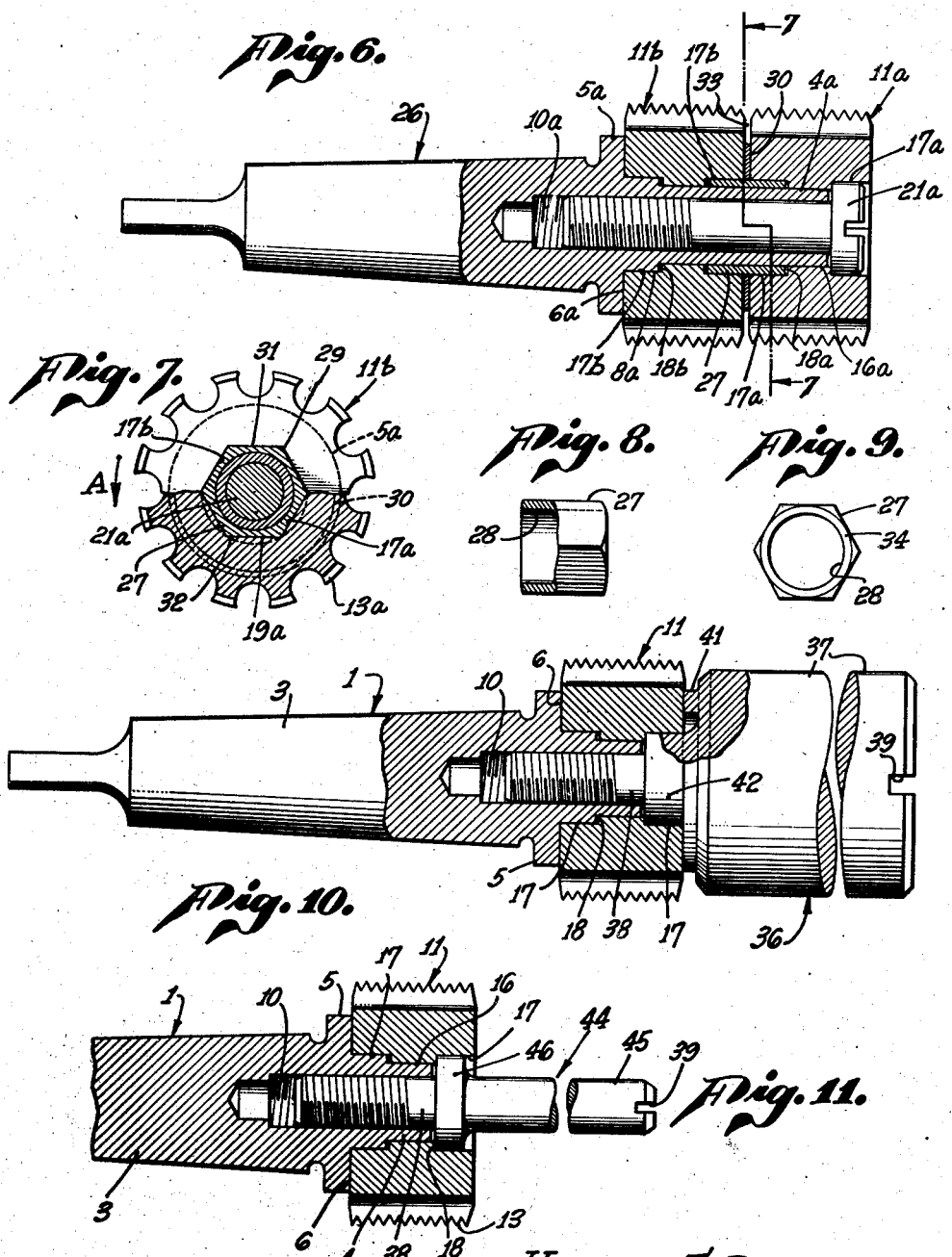

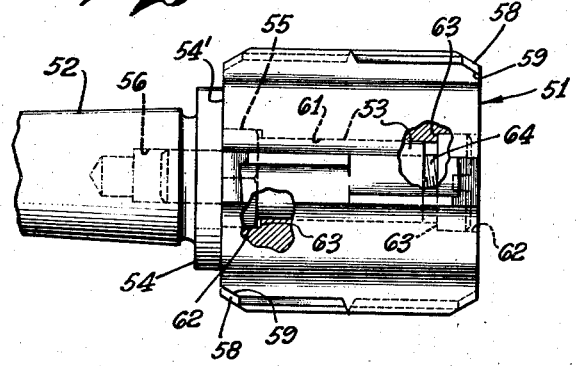
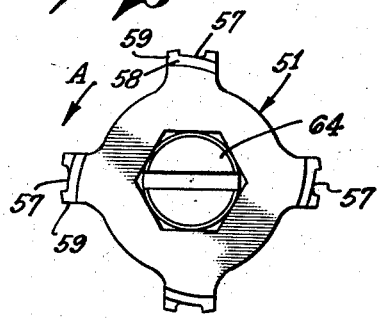
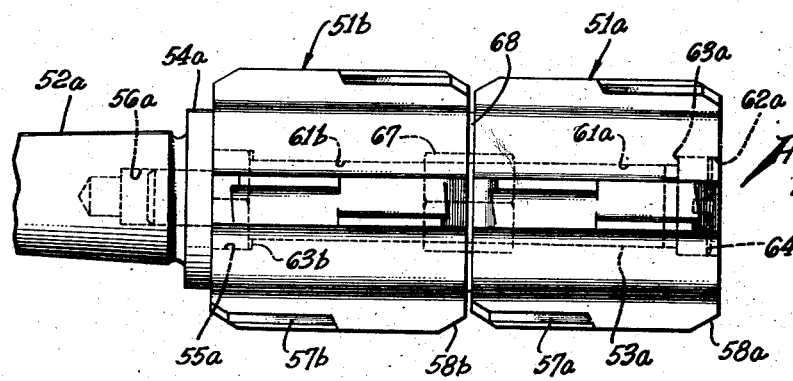
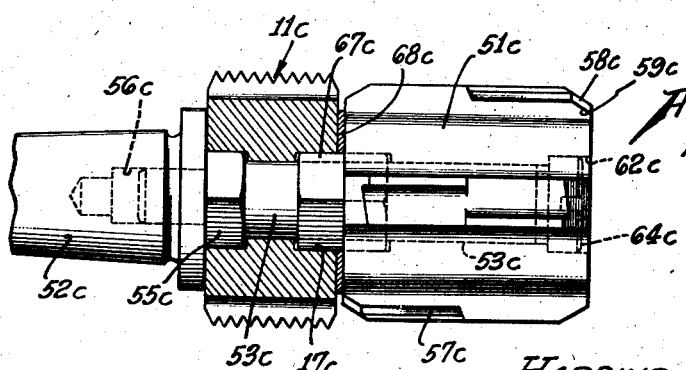
Harding F. Bakewell,
INVENTOR

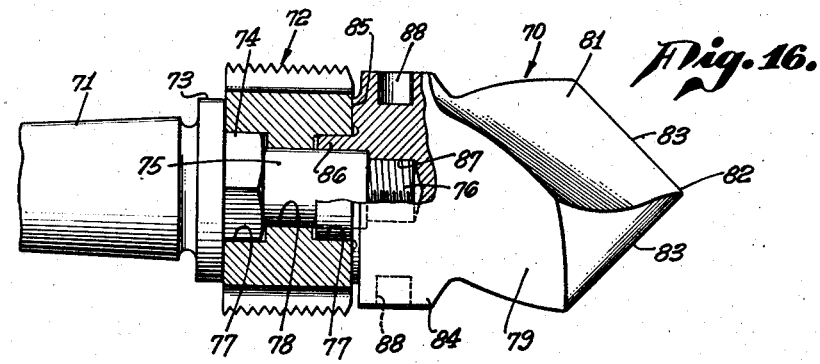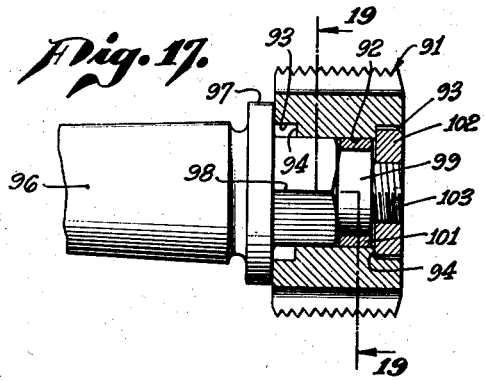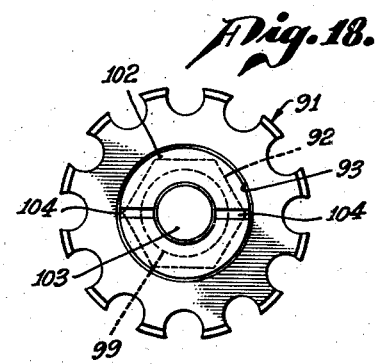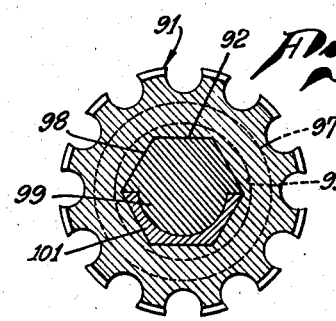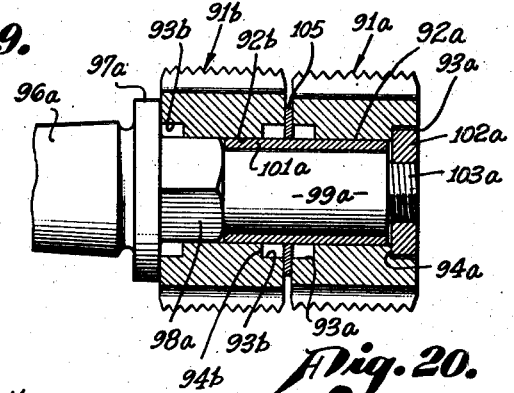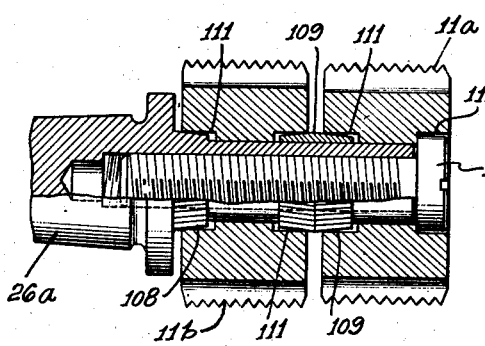

Patented Feb. 13, 1945

2,369,273

UNITED STATES PATENT OFFICE 2,369,273

ROTARY CUTTING TOOL

Harding F. Bakewell, San Marino, Calif.

Application March 23, 1943, Serial No. 480,237

11 Claims. (Cl. 10—146)

This invention relates to rotary cutting tools, and particularly to tools of this class in which a cutting member is removably mounted on a shank for rotative engagement with the work. The tool may be rotated and the work held in a fixed position, or the tool may be held fixed and the work rotated. The term "rotary cutting tool" is accordingly used herein to designate a tool that performs a cutting operation by relative rotating engagement between the tool and the work, and without limitation to rotation of the tool itself.

Tools of this type may be used for various purposes, the cutting member employed being one that is adapted to perform the desired operation on the work, such as a tap for internally threading the work or a reamer for enlarging the internal diameter of drilled or cored holes or bores. The principal object of the invention is to provide an improved construction of a rotary cutting tool having a removable cutting member, in which the cutting member is positively and rigidly secured to the shank and accurately centered and alined with respect thereto.

A further object of the invention is to provide a tool of this type in which the cutting member and shank are provided with interengaging driving shoulders that are located inward from the periphery of the cutting member and are accurately formed so as to provide simultaneous and positive driving engagement between the shank and the tap at a plurality of circumferentially spaced positions, whereby the force required to drive the cutting member is distributed and excessive concentration of pressure is avoided, while at the same time avoiding interference with the cutting operation or weakening of the tool adjacent the cutting edges.

Numerous advantages are obtained by the use of a tool having a removable cutting member, because only the cutting member itself need be made of the required high speed alloy steel. When the cutting member is worn out, it may be replaced by a new member on the same shank, thus effecting a tremendous saving in consumption of special alloy steel.

Furthermore, cutting members of different types or sizes may be used interchangeably on a single shank. By means of my improved construction I am able to obtain these advantages without any loss of accuracy in the work, with a positive and uniform drive of the cutting member and without appreciable wear due to driving engagement between the shank and the cutting member.

A further object is to provide a construction having the above mentioned advantages, and in which relatively simple operations may be employed in forming the interengaging parts with the accuracy required to ensure correct positioning of the cutting member and simultaneous engagement of the respective driving shoulders.

Another object is to provide a tool of this type whose construction is such that adequate strength is provided to resist stresses produced in the tool during use, even at high speeds of operation, and even with cutting members of relatively small diameter.

A further object is to provide a construction in which the interengaging driving means on the shank and the cutting member are held securely in rigid engagement with each other so as to resist rotation of the cutting member relative to the shank in both directions of such relative rotation.

Another object of the invention is to provide a tool of the type above described in which the cutting member may be made reversible on the shank, that is, it may be secured to the shank with either end disposed forwardly for initial engagement with the work, and provided with cutting elements located and formed for proper cutting engagement with the work when mounted in either of these two positions, so that when the cutting elements that engage the work when the cutting member is in one position become worn, the cutting member may simply be removed and reversed and fresh cutting elements made available.

Another object is to provide a construction in which a pilot member may be secured to the shank, projecting forwardly beyond the cutting member for guiding the tool relative to the work. A particular object in this case is to provide for utilizing the pilot member to secure the removable cutting member to the shank.

Another object is to provide a construction in which multiple cutting members of progressively increasing working diameters may be removably mounted on the same shank and secured thereto in properly alined and centered relation and in positive driving engagement therewith, whereby the desired cutting may be done partly by the first cutter and completed by a succeeding cutter. In this connection, a plurality of cutting members of different types may be so mounted in order to perform different cutting steps in a single operation with the same tool. As a specific example, a reamer and a tap may be used in this manner to ream and tap a hole in one operation. As another example, I may use a combination of drill and tap, to drill and tap a hole with the same tool. In either of these cases, the first cutting member is one that cuts a smooth cylindrical bore, while the second is a threading tool.

Further objects and advantages of the invention will be pointed out hereinafter or will be apparent from the following description.

The accompanying drawings illustrate rotary cutting tools in accordance with my invention, and referring thereto:

Fig. 1 is a longitudinal vertical section, partly in elevation, of a tapping tool provided with a single removable tap member;

Fig. 2 is an end view thereof looking toward the left in Fig. 1;

Fig. 3 is a transverse section on line 3—3 in Fig. 1;

Fig. 4 is a partly sectional side elevation of the shank shown in Fig. 1;

Fig. 5 is an end view of the shank looking toward the left in Fig. 4;

Fig. 6 is a longitudinal vertical section, partly in elevation, of a multiple-tap tool;

Fig. 7 is a transverse section on line 7—7 in Fig. 6;

Fig. 8 is a partly sectional side elevation of the driving sleeve connecting the two tap members in Figs. 6 and 7;

Fig. 9 is an end view of said driving sleeve;

Fig. 10 is a partly sectional side elevation of a tapping tool similar to that shown in Fig. 1, provided with a pilot member of maximum diameter;

Fig. 11 is a partial view similar to Fig. 10 showing a pilot member of smaller diameter;

Fig. 12 is a side elevation, partly in section, of a reaming tool provided with a removable shell reamer;

Fig. 13 is an end view thereof, looking toward the left in Fig. 12;

Fig. 14 is a side elevation of a multiple-reamer tool;

Fig. 15 is a side elevation of a combined reaming and tapping tool;

Fig. 16 is a partly sectional side elevation of a combined drilling and tapping tool;

Fig. 17 is a view showing a modified construction of a tapping tool, the shank being shown in elevation and the other parts in section;

Fig. 18 is an end view thereof looking toward the left in Fig. 17;

Fig. 19 is a transverse section on line 19—19 in Fig. 17;

Fig. 20 shows a modified construction of a multiple-tap tool, the shank being shown in elevation and the other parts in section; and Fig. 21 is a longitudinal section showing another modification of the invention, as applied to a multiple-tap tool, the shank being shown partly in elevation.

Referring to Figs. 1 to 5, I have shown a tool comprising a shank 1, a cutting member 11 removably mounted on a portion or extension of the shank indicated generally at 2, adjacent one end thereof, and a threaded retaining member such as screw 21 securing the cutting member to the shank. The portion of the shank adjacent the other end, as indicated at 3, is formed to fit within a chuck for rotating the tool, and may be either tapered or straight, as desired.

As best shown in Figs. 4 and 5, the shank is provided with a cylindrical portion 4 extending a short distance from the tap-receiving end, and with an annular flange 5 at a position removed from that end. The outer face 6 of the flange provides an annular outwardly projecting shoulder against which one end of the cutting member 11 bears when mounted on the shank, as shown at 7 in Fig. 1. The face or shoulder 6 is machined to conform accurately to a surface of revolution about the axis of the shank, and preferably to a plane surface perpendicular to said axis.

When the invention is embodied in the construction shown in Fig. 1, between shoulder 6 and cylindrical portion 4, the extension 2 of shank 1 is provided with a driving portion 8 of hexagonal or other polygonal external shape. The faces of said polygonal driving portion are preferably disposed wholly outward with respect to the periphery of the cylindrical portion 4, thus providing a plurality of circumferentially spaced, longitudinally extending, shoulders 9 that project outwardly beyond the periphery of said portion 4. The external cross-sectional shape of portion 8 may be described as a polygon circumscribed about a circle whose radius is at least equal to, and preferably somewhat greater than, the radius of cylindrical portion 4.

Shank 1 is further provided with a threaded bore 10 extending longitudinally and centrally thereof, from the tap-receiving end, and of sufficient depth to securely hold screw 21 for securing the cutting member in position, as described hereinafter.

The cutting member 11 is of generally annular shape, and is shown as a shell tap provided with external threads 13 for use in cutting internal threads. The tap is provided with a plurality of alternate flutes 14 and threaded lands 15.

The tap is shown as provided with a centrally located cylindrical bore 16 which is accurately machined to make a close fit with the cylindrical portion 4 of the shank, said bore being formed in accurate coaxial relation to the circumferentially disposed cutting teeth of the tap, so as to accurately center the tap relative to the axis of the shank. Adjacent each end of the tap an enlarged recess is provided, as at 17, so as to provide an annular outwardly projecting shoulder 18 at the inner end of each such recess and at each end of bore 16.

In the recessed end portions 17, the interior surface of the tap is of hexagonal or other polygonal shape as indicated in Figs. 2 and 3, so as to provide adjacent each end of the tap a set of circumferentially spaced inwardly projecting longitudinally extending shoulders 19, each set comprising a plurality of such shoulders corresponding to the outwardly projecting shoulders 9 of the shank and so positioned that all of the shoulders 19 of one set are simultaneously in close engagement with the respective shoulders 9 when the tap is mounted on the shank. The internal cross-sectional shape of each of these recessed portions of the tap may be described as a polygon circumscribed about a circle whose radius is at least equal to that of cylindrical bore 16, and preferably somewhat greater in order to provide a continuous annular shoulder 18 whose minimum radial width (see Fig. 2) is such as to provide an adequate surface for engagement by the head of screw 21.

The screw 21 is screwed tightly in threaded bore 10, the head of said screw bearing against the forwardly disposed shoulder 18 of the tap and holding the rear end face of the tap firmly against shoulder 6. The cylindrical portion 4 of the shank fits closely within the bore 16 of the tap and serves to support and center the tap on the shank.

The tap 11 is shown as adapted to be mounted reversibly on the shank, with either end thereof in engagement with shoulder 6, the other end of the tap being in either case disposed at the forward end of the tool for initial engagement with the work. Each end of the tap is accordingly shaped to conform closely to the surface of shoulder 6, so as to maintain the tap in accurate alinement with the shank. The tap is also shown as chamfered at each end in well-known manner, as at 22, to facilitate engagement of the threads with the work in either position of the tap. Adjacent each end of the tap, the threads are formed to provide cutting teeth at the leading edges of the lands in the direction of rotation relative to the work when that end is in position to initially engage the work, and it will be appreciated that these cutting teeth are disposed at opposite edges of the lands adjacent the respective ends of the tap. Furthermore, if desired the threads may be undercut at the leading edges of the lands in the direction of such relative rotation, and may be back-relieved toward the trailing edges in well-known manner, such undercutting and back-relieving being also oppositely arranged adjacent the respective ends of the tool.

The direction of rotation of the tap relative to the work, for cutting right-hand threads, is indicated by the arrow at A in Fig. 2. Upon rotation of the shank in that direction, with the tap mounted either in the position shown or in the reverse position on the shank, the several outwardly extending shoulders 9 on the driving portion 8 of the shank engage the respective inwardly extending shoulders 19 of the set adjacent the end of the tap which is at that time disposed rearwardly with reference to the work. Thus, the driving force required to be transmitted from the shank to the tap is distributed over the entire areas of these engaging shoulders.

The recesses 17 of the tap are shown as being of somewhat greater axial length than the polygonal portion 8 of the shank, so that when either end of the tap engages shoulder 6 of the shank the rearwardly disposed shoulder 18 is spaced somewhat from the shoulder 23 at the forward end of said polygonal portion. If desired, however, these recesses may be made of less axial length so that said shoulders 18 and 23 may be brought into abutting relation in addition to, or instead of, bringing the end of the tap into engagement with shoulder 7, for properly alining the tap on the shank.

It will be seen that the polygonal driving portion 8 of the shank provides a plurality of salient angular projections that extend longitudinally of the shank. These angular projections fit snugly within a plurality of correspondingly shaped reentrant angular portions in one or the other of the recesses 17 of the tap, so as to provide firm positive driving engagement between the faces of the driving portion 8 and recess 17 at both the leading and trailing sides of each angle in the normal direction of rotation of the tool. This construction is of advantage in preventing any rotation of the tap relative to the shank, in either direction of such relative rotation. This is particularly advantageous for use on certain types of machines in which it is required that, in rotating the tap in the reverse direction for removal from the work, the tap shall remain in the same relative position of rotation with respect to the shank that it had during the tapping operation.

In the multiple-tap tool shown in Figs. 6 and 7, two shell tap members 11a, and 11b are mounted in successive positions longitudinally of the shank 26. The cutting threads of tap member 11a mounted at the forward end of the shank are of somewhat smaller diameter than those of the second tap member 11b, so that the work of cutting the threads is divided between the two taps. Each of the taps 11a and 11b is similar in construction to the tap 11 shown in Fig. 1, and corresponding parts thereof are designated by the same reference numbers, with the addition of the letters a and b, respectively.

The shank 26 is similar to the above described shank 1, except that the cylindrical portion 4a extends entirely through the rearwardly disposed tap member 11b and is of sufficient length to project into the forward tap member 11a and through the major portion of the length of cylindrical bore 16a thereof. The shank is provided as before with an outwardly extending annular shoulder 6a and with a driving portion 8a of hexagonal or other polygonal shape, between the shoulder 6a and cylindrical portion 4a. Other parts of the shank are designated by the same reference numbers as in the first described form with the addition of the letter a.

A relatively thin spacing member or washer 30 is preferably provided between the two tap members, and is provided with flat end faces bearing against the rear end of tap 11a and the forward end of tap 11b. Said spacing member is of less diameter than the tap, so that, when the parts are assembled on the shank, a short space is provided between the two taps as indicated at 33 in Fig. 6 in order to facilitate the escape of chips produced by the cutting teeth at the forward end of tap member 11b.

A driving sleeve 27 is provided, fitting around the cylindrical shank portion 4a, and extending within the rearwardly disposed recess 17a of tap 11a and the forwardly disposed recess 17b of tap 11b. Said sleeve also extends through a central opening in spacing member 30.

The driving sleeve 27 is shown more fully in Figs. 8 and 9. It is provided with a cylindrical bore 28 fitting slidably around the cylindrical portion 4a of the shank and preferably in close engagement therewith, and its outer face is of hexagonal or other polygonal shape corresponding to, and formed accurately for close driving engagement with, the recesses 17a and 17b in the respective tap members. Thus, said driving sleeve is provided with a plurality of outwardly projecting shoulders 29 in simultaneous close driving engagement with inwardly projecting shoulders 31 in the forwardly disposed polygonal recess 17b of tap 11b, and with a plurality of outwardly projecting shoulders 32 in simultaneous close driving engagement with the inwardly projecting shoulders 19a in the rearwardly disposed recess 17a of tap member 11a. The length of driving sleeve 27 is preferably such as to extend through the major portion of the length of the recessed portions 17a and 17b of the two tap members, the ends thereof being preferably spaced somewhat from the shoulders 18a and 18b of the respective taps, as shown in Fig. 6.

A retaining screw 21a is secured in threaded bore 10a of the shank. The head of said screw bears against shoulder 18a of the first tap to hold the two tap members and the spacing member 30 firmly in position on the shank, the rearward end of tap 11b being held in firm engagement with shoulder 6a. At the same time, the driving sleeve 27 is held in position around the shank and in close driving engagement with the taps, as described above. Thus, rotative driving force is transmitted from the driving shoulders of the shank to tap 11b, and thence through driving sleeve 27 to tap 11a.

When two taps are thus used for making a rough cut and a finishing cut in producing a set of internal threads, the cutting threads of the two taps should be ground in pairs, and when so ground, can not be reversed on the shank as described above in connection with the single tap. However, where tough high carbon steel is being tapped it is a decided advantage to combine both the roughing and finishing taps in a single tool, particularly when used on a tapping machine having a lead screw feed, which greatly enhances the life of the tap and often permits tapping successfully where it could not be done otherwise.

Figs. 10 and 11 illustrate the use of pilot members for guiding the tool in cases where it is necessary that the thread formed by the tap be formed accurately in concentric relation to a bore in the work. In these figures, the construction of shank 1 and tap member 11 is the same as shown in Figs. 1 through 5, and the mounting of the tap on the shank is also the same except that the threaded retaining member is provided with a head portion formed as a pilot extension projecting forwardly beyond the tap for engagement with a preformed bore in the work.

In Fig. 10 the pilot member 36 comprises a cylindrical pilot head or extension 37 of approximately the maximum diameter that can be used with the tap diameter shown, and a coaxially disposed threaded stem 38 engaging threaded bore 10 of the shank, whereby the pilot extension is accurately centered with respect to the tap. The cylindrical pilot portion 37 is slotted at its forward end, as at 39, for rotation by a screwdriver or the like, and is provided at its rearward end with an annular shoulder 41 formed as a surface of revolution, which engages the forward end of tap 11 to hold said tap securely in position on the shank and ensure proper alinement of the pilot relative to the shank and tap. The pilot member is also shown as provided with a cylindrical portion 42 extending within the polygonal recess 17 at the forward end of the tap.

In Fig. 11 the pilot member 44 is similar to the member 36 in Fig. 10, except that the forwardly projecting pilot extension 45 is of smaller diameter for engaging a smaller bore in the work, and is provided with a flange portion 46 extending within recess 17 in the tap 11, said flange being of greater diameter than the cylindrical bore 16 of the tap and bearing against the forwardly disposed shoulder 18 to secure the tap firmly in position on the shank in the same manner as the head of screw 21 in Fig. 1.

In the reaming tool shown in Figs. 12 and 13, the cutting member 51 is formed as a shell reamer removably mounted on shank 52. Said shank is similar to shank 1 above described, being similarly provided with a cylindrical portion 53, an annular flange 54 providing an outwardly extending shoulder 54', a hexagonal or other polygonal driving portion 55, and a central threaded bore 56.

The reamer 51 is provided with a plurality of spaced lands 57 which may be either straight or helical and either parallel or tapered. The lands are chamfered at both ends as at 58 and are provided with suitably shaped cutting edges 59 arranged oppositely at the portions adjacent the respective ends thereof, said cutting edges at each end being at the leading edges in the direction of rotation (indicated by the arrow at A in Fig. 13) when that end is disposed forwardly for initially engaging the work.

Reamer 51 is also provided with a centrally located cylindrical bore 61 fitting closely the cylindrical portion 53 of the shank, with a centrally located recess 62 at each end of hexagonal or other polygonal shape, formed accurately for engagement with the driving portion 55 of the shank, and with outwardly extending annular shoulders 63 at the inner ends of said recesses. The relative arrangement and functions of these parts and of the coacting parts of the shank are the same as in Figs. 1 to 5, except that the cylindrical portion 53 and bore 61 are of somewhat greater length, the reamer being shown as relatively longer than the tap member of Fig. 1. As before, the reamer 51 is secured in position on the shank by means of screw 64 whose head engages the forwardly disposed shoulder 63 and maintains the rearward end of the reamer in engagement with shoulder 54' on the shank.

It will be apparent that reamer 51 is reversible on the shank in the manner described above, and is adapted for cutting engagement with the work when mounted in either of the two positions. Pilot members, as illustrated in Figs. 10 and 11, may also be employed in conjunction with the above described reamer, and may in this case be similarly used to secure the reamer to the shank.

Fig. 14 shows a multiple-reamer tool, comprising two shell reamers 51a and 51b mounted in successive positions on shank 52a. The forwardly disposed reamer 51a is of smaller diameter than reamer 51b, whereby the two reamers are adapted to make roughing and finish cuts respectively, or making multiple machining operations. The construction of each reamer is the same as in Figs. 12 and 13. The construction of shank 52a and the mounting of the reamers thereon are the same as in the multiple tap tool shown in Figs. 6 and 7, except for difference in length of certain parts due to the greater relative length of the reamers. The cylindrical portion 53a of the shank extends through the rearward reamer 51b and through the major portion of the cylindrical bore 61a of the forward reamer, and driving connection between the two reamers is again provided by means of a hexagonal driving sleeve 67 which is similar in construction and function to the sleeve 27 shown in Figs. 8 and 9. Said sleeve is held in driving engagement with the driving shoulders within the rearwardly and forwardly disposed polygonal recesses of the respective reamers 51a and 51b, and screw 64a engages threaded bore 56a in the shank to secure the reamers in position on the shank, a suitable spacing member 68 being preferably provided between the two reamers, all in the same manner as shown in Figs. 6 and 7.

Other combinations of cutting members may also be used. For example, Fig. 15 shows a shell reamer 51c mounted on the forward end portion of a shank 52c, and a shell tap 11c mounted on the shank rearwardly of the reamer. The effective diameter of the reamer is about equal to or slightly less than the minor diameter of the tap, whereby the tool is adapted to perform a combined reaming and tapping operation in a bore. Reamer 51c and tap 11c are similar to reamer 51 and tap 11 described above and are mounted in the same manner on shank 52c which is similar to shank 52 but whose cylindrical portion 53c is of sufficient length to extend through the tap and through the major portion of the length of the cylindrical bore 61c in the reamer. The tool also comprises, as before, a hexagonal driving sleeve 67c providing a driving connection between the tap and the reamer and a screw 64c for securing the two cutting members in position on the shank, with a spacing member 68c therebetween.

A combined drilling and tapping tool is shown in Fig. 16, comprising a shank 71, a shell tap 72 removably mounted thereon, and a drill member 70 removably secured to the shank forwardly of the tap and serving as the means for securing the tap to the shank. Shank 71 is provided with a flange 73, a hexagonal or other polygonal driving portion 74, and a cylindrical portion 75, similar to the corresponding parts of shank 1 in Fig. 1, except that the cylindrical portion 75 is of greater length and is shown as extending somewhat beyond the forward end of the tap. Said shank is also shown as provided at its forward end with an externally threaded portion 76 of reduced diameter.

The construction of tap 72 and the relation thereof to the shank are the same as shown in Fig. 1 or in Fig. 15, said tap being provided as before with a hexagonal or polygonal recess 77 at each end and a cylindrical bore 78 engaging cylindrical portion 75 of the shank.

The drill member 70 is shown as provided with spiral lands 79 and flutes 81, the forward end thereof being formed as a drill point 82 of any usual or suitable shape, providing a suitably inclined cutting edge 83 at the leading edge of the tapered forward end portion of each land. The diameter of drill 70 is about equal to or slightly less than the minor diameter of the tap. The rear portion 84 of the drill is shown as being cylindrical in shape and provided with a rearwardly projecting annular shoulder portion 85 bearing against the forward end of the tap, and with a hollow cylindrical coaxial sleeve portion 86 of reduced diameter, also extending rearwardly therefrom and adapted to fit within the forwardly disposed recess 77 of the tap and to fit slidably around and in close engagement with the forward end of cylindrical portion 75 of the shank so as to accurately center and support the drill member on the shank.

The drill is also provided with a centrally disposed threaded bore 87 engaging the threaded portion 76 of the shank to secure the drill to the shank and to also secure the tap member 72 in position on the shank between shoulder 85 and flange 73. To facilitate screwing the drill on the shank, the drill 70 may be provided with circumferentially spaced recesses 88 adapted to receive a spanner wrench or other suitable tool. It will be noted that the specific securing means 76 and 87 shown in Fig. 16 differs from that shown in the other tools previously described above, such as threaded stem 38 and bore 10 in Fig. 10, and it will be appreciated that each of the tools described herein may be provided with either of those two general types of securing means or with other suitable means for securing to the shank the member which in turn secures the annularly shaped cutting member in position on the shank.

The operation of the combination tools shown in Figs. 15 and 16 is believed to be obvious. As the tool is moved forwardly in rotative cutting engagement with the work, the reamer member 51c or the drill member 70 first cuts a smooth cylindrical bore and the associated tap member then enters and threads such bore.

Various modifications may be made in the elements of the tool within the scope of this invention. For example, as shown in Figs. 17 to 19, the removable cutting member such as shell tap 91 may be provided with a central hole 92 of hexagonal or other polygonal shape extending coaxially therethrough from one end to the other and providing, as before, a plurality of circumferentially spaced inwardly projecting longitudinally extending shoulders at positions adjacent each end of the tap. Such a hole may be formed accurately by a simple broaching operation. The tap is also shown as recessed outwardly for a short distance from each end, to form cylindrical recesses 93 extending outward beyond the periphery of hole 92 so as to provide annular outwardly extending shoulders 94 at the inner ends of the respective recesses.

The shank 96 is provided as before with a flange 97, a hexagonal or other polygonal shaped driving portion 98 formed to provide a plurality of shoulders for close driving engagement with the walls of hole 92, and a cylindrical portion 99 of reduced diameter disposed forwardly of portion 98. The driving portion 98 is of sufficient length to extend through the rearwardly disposed recess 93 and for a substantial distance within the hole 92, so as to provide adequate driving engagement between the interengaging shoulders in the same manner as described above.

A sleeve or bushing member 101 fits closely but removably around the cylindrical portion 99 of the shank, with its outer surface fitting closely within the forward portion of hole 92, so as to center and support the tap on the shank. The exterior surface of this sleeve is shown as being of hexagonal or other polygonal shape conforming with that of hole 92, but said sleeve may if desired have a cylindrical outer surface bearing against the walls of said hole. As will be apparent, the tap is reversible, as before, and may be mounted on the shank with either end disposed forwardly and with the shoulders of driving portion 98 in rotative driving engagement with the shoulders of hole 92 at a position adjacent the other end of the tap. Another possible modification is to make the polygonal driving portion 98 of the shank of sufficient length to extend through the major portion of the length of hole 92, whereby said portion 98 will itself serve to firmly support and center the tap, and the sleeve 101 is omitted.

The tap may, if desired, be secured to the shank in the same manner as in Fig. 1. However, I have shown in this case securing means of the same general type as in Fig. 16, comprising a threaded nut 102 engaging a short threaded extension 103 at the forward end of the shank. Said nut 102 may be of circular shape and provided with slots 104 for rotation thereof by a suitable tool. Nut 102 is adapted to enter the forwardly disposed recess 93 and to engage shoulder 94 to hold the tap securely on the shank and in engagement with flange 97.

Fig. 20 illustrates the application of this same type of construction in a multiple-tap tool. The relative arrangement and proportions of the two shell taps 91a and 91b are the same as in Fig. 6, while the construction of each tap is similar to that of tap 91 in Fig. 17 and the parts are designated by the same numbers followed by the letters a and b respectively. The shank 86a is generally similar to that shown in Fig. 17, except that the cylindrical portion 99a extends forwardly beyond the tap 91b and through the major portion of the length of the hole 92a in tap 91a. The other portions of the shank are numbered to correspond with the numbering in Fig. 17, with the addition of the letter a. The sleeve or bushing member 101a is of the same cross-sectional shape as the bushing member 101 in Fig. 17 and extends around the cylindrical portion 99a of the shank, with its exterior surface in close driving engagement with the polygonal surfaces of holes 92a and 92b in the respective tap members. Said sleeve or bushing member serves not only to center and support both tap members on the shank but also performs the same function as the driving sleeve 27 in Fig. 6, namely, to transmit rotative driving force from tap member 91b to tap member 91a. As before, the taps are secured in position by means of nut 102a, a suitable annular spacing member 105 being provided between the two tap members. Said spacing member is similar in shape and function to the spacing member 30 in Fig. 6.

It will be apparent that securing means such as shown in Fig. 6 could, if desired be substituted for the nut 102a and the externally threaded extension 103a shown in Fig. 20. Furthermore, it will be apparent that the modified constructions shown in Figs. 17 to 19 and in Fig. 20 may be applied respectively to a reaming tool as shown in Figs. 12 and 13 and a multiple reamer tool such as shown in Fig. 14. These constructions may also be used in connection with pilot members such as shown in Figs. 10 and 11, with combination reaming and tapping tools as shown in Fig. 15 or combination drilling and tapping tools such as shown in Fig. 16.

In all of the tools described above, the interengaging hexagonal or polygonal driving portions are shown as extending parallel to the axis of the tool. This is not essential however, and if desired these polygonal driving portions may be tapered longitudinally and still provide the desired rotative driving engagement. For example, in Fig. 1 the polygonal recesses 17 of the tap member may be tapered or flared outwardly toward each end of the tap. As another example, the driving portion on the shank, and the driving portions of the driving sleeve in tools having multiple cutting members may be tapered longitudinally. This latter modification is illustrated in Fig. 21, which is similar to Fig. 6, except that the hexagonal or polygonal driving portion 108 of the shank is tapered inwardly toward the forward end of the shank, and the driving sleeve 109 is tapered inwardly from the middle toward each end. The hexagonal or polygonal recesses 111 in the tap members are shown as being parallel to the axis, and held by screw 112 in driving engagement with the tapered portions 108 and 109.

I claim:

1. In a rotary cutting tool, the combination comprising: a shank having a cylindrical portion and a driving portion, said driving portion being formed externally to provide a plurality of circumferentially spaced outwardly projecting longitudinally extending shoulders; a cutting member removably mounted on said shank in a position around said cylindrical and driving portions of said shank, said cutting member being formed internally to provide a plurality of circumferentially spaced inwardly projecting longitudinally extending shoulders in close rotative driving engagement with the respective shoulders on the driving portion of said shank, and said cutting member being also provided with a centrally located cylindrical bore engaging closely the cylindrical portion of the shank; and means securing said cutting member to said shank with the parts in engagement as above set forth.

2. The construction set forth in claim 1, said cutting member being of symmetrical construction in an axial direction, whereby it may be mounted removably upon said shank with either end disposed forwardly for initially engaging the work, said cutting member being provided with a plurality of circumferentially spaced inwardly directed longitudinally extending shoulders adapted for engagement with the shoulders of said shank when said cutting member is mounted with either end disposed forwardly.

3. In a rotary cutting tool, the combination comprising: a shank having a cylindrical portion adjacent one end and a driving portion located rearwardly of said cylindrical portion, said driving portion being formed externally to provide a plurality of circumferentially spaced outwardly projecting longitudinally extending shoulders; a cutting member removably mounted on said shank with its rearward portion surrounding said driving portion and its forward portion surrounding said cylindrical portion of the shank, said rearward portion of the cutting member being formed internally to provide a plurality of circumferentially spaced inwardly projecting longitudinally extending shoulders in close rotative driving engagement with the respective shoulders on the driving portion of said shank; and means securing said cutting member to said shank and supporting said cutting member in coaxial alined position with respect to said cylindrical portion of the shank.

4. The construction set forth in claim 3, the forward portion of said cutting member being provided with a portion formed internally to provide a plurality of circumferentially spaced inwardly directed longitudinally extending shoulders corresponding in dimensions and relative placement to the shoulders provided at said rearward end of said cutting member, whereby said cutting member is adapted for mounting on said shank with either end of said cutting member disposed forwardly for initially engaging the work and the shoulders at the other end of said cutting member in engagement with the shoulders on said shank.

5. In a rotary cutting tool, the combination combination comprising: a shank having a cylindrical portion adjacent one end and a driving portion located rearwardly of said cylindrical portion and formed to provide a plurality of circumferentially spaced longitudinally extending angular shoulders that project outwardly beyond the periphery of said cylindrical portion; and means removably mounted on said shank and provided with peripherally disposed cutting elements, with a plurality of circumferentially spaced inwardly projecting longitudinally extending shoulders in close driving engagement with the respective shoulders of the shank, and with a centrally located cylindrical bore engaging closely the cylindrical portion of the shank.

6. In a rotary cutting tool, the combination comprising: a shank having a cylindrical portion adjacent one end and a driving portion located rearwardly of said cylindrical portion and formed to provide a plurality of circumferentially spaced outwardly projecting longitudinally extending shoulders; a cutting member removably mounted on said shank and having a plurality of circumferentially spaced inwardly projecting longitudinally extending shoulders corresponding to, and positioned for simultaneous close driving engagement with, the respective shoulders of the shank, and a cylindrical centrally located bore engaging closely the cylindrical portion of the shank; and means securing said cutting member to said shank with the parts in engagement as above set forth.

7. In a rotary cutting tool, the combination comprising: a shank having a cylindrical portion adjacent one end and a driving portion located rearwardly of said cylindrical portion and formed to provide a plurality of circumferentially spaced outwardly projecting longitudinally extending shoulders; a cutting member removably mounted on said shank around said driving and cylindrical portions thereof, said cutting member having a central hole extending therethrough and formed to provide a plurality of circumferentially spaced inwardly projecting longitudinally extending shoulders in close driving engagement with the respective shoulders of the shank and spaced outwardly from the cylindrical portion of the shank; and a sleeve disposed between and in close engagement with the cutting member and the cylindrical portion of the shank.

8. A cutting member for rotary cutting tools, adapted to be removably and reversibly mounted on a shank and provided with peripherally disposed cutting elements, said member having a centrally disposed cylindrical bore extending therethrough and an enlarged central recess adjacent each end formed to provide a plurality of circumferentially spaced inwardly projecting longitudinally extending shoulders.

9. In a rotary cutting tool, the combination comprising: a shank having a portion formed to provide a plurality of circumferentially spaced outwardly projecting longitudinally extending shoulders; a plurality of cutting members removably mounted on said shank in successive positions longitudinally thereof, the rearward one of said cutting members being provided with a plurality of circumferentially spaced inwardly projecting longitudinally extending shoulders in close driving engagement with the respective shoulders of the shank, and a sleeve member removably mounted on said shank and in rotative driving engagement with said rearward cutting member and the adjacent cutting member, whereby rotative driving force is transmitted from the shank through said rearward cutting member and said sleeve to said adjacent cutting member.

10. In a rotary cutting tool, the combination comprising: a shank having a portion of polygonal external shape and a cylindrical portion of reduced diameter extending forwardly from said polygonal portion; a driving sleeve fitting closely around the cylindrical portion of the shank and having an exterior surface of polygonal shape; and two cutting members removably mounted on said shank in successive positions longitudinally thereof, the rearward one of said cutting members having a portion of polygonal internal shape fitting closely around the polygonal portion of the shank in driving engagement therewith, and each of said cutting members having a portion of polygonal internal shape fitting closely around and in driving engagement with the external surface of said sleeve.

11. In a rotary cutting tool, the combination comprising: a shank having a portion of polygonal external shape tapered inwardly toward the forward end of the shank and a cylindrical portion of reduced diameter extending forward from said polygonal portion; a driving sleeve fitting closely and slidably around the cylindrical portion of the shank and having an exterior surface of polygonal shape tapered inwardly from the middle toward each end thereof; two cutting members removably mounted on said shank in successive positions longitudinally thereof, the rearward one of said cutting members having a portion of polygonal internal shape adapted to fit around and in driving engagement with the tapered polygonal portion of the shank and another portion of polygonal internal shape adapted to fit around and in driving engagement with the rearwardly tapered portion of said sleeve, and the forward one of said cutting members having a portion of polygonal internal shape adapted to fit around and in driving engagement with the forwardly tapered portion of said sleeve; and means removably secured to the shank and engaging the forward cutting member to hold the cutting members in such driving engagement with the sleeve and the shank.

HARDING F. BAKEWELL.